Patented Jan. 31, 1933

1,895,620

UNITED STATES PATENT OFFICE

WILLIAM A. GALE AND CHARLES F. RITCHIE, OF TRONA, CALIFORNIA, ASSIGNORS TO AMERICAN POTASH & CHEMICAL CORPORATION, OF TRONA, CALIFORNIA, A CORPORATION OF DELAWARE

DOUBLE SALT AND METHOD OF PRODUCING SAME

No Drawing. Continuation of application Serial No. 5,157, filed January 27, 1925. This application filed July 3, 1929. Serial No. 375,876.

The present invention relates to a new double salt and method of producing the same, and refers also to methods of purifying solutions through the production of the new double salt. This application is a continuation of our co-pending application Serial Number 5,157, filed January 27, 1925.

We have discovered a new double salt which contains equal molecular quantities of trisodium phosphate and sodium metaborate, together with water of crystallization. The probable formula for this new double salt is $Na_3.PO_4.NaBO_2.18H_2O$. The new double salt is very alkaline and has been found to possess considerable value in the laundry art. It has also been found that the new double salt is an excellent water softener and may be successfully incorporated into a variety of detergents. The product may be employed in its hydrated form or may be dehydrated; in either case, the product combines the valuable properties of both sodium phosphate and borax compounds.

The new double salt is relatively insoluble in water, at low temperatures, but readily soluble in water at high temperatures. For example, at 25° C. the new salt is soluble to the extent of 12.8 parts per hundred parts of water, while at 35° C. it is soluble to the extent of 20.8 parts per hundred parts of water. It has also been found that the presence of common ions of sodium, phosphate or borate in a solution depresses materially the solubility of this new salt. For example, in a saturated solution of sodium chloride, the new double salt is soluble at 25° C. only to the extent of 7.6 parts per hundred parts of water. In a solution saturated in trisodium phosphate, the new double salt is soluble only to the extent of 1.9 parts per hundred parts of water at 25° C. and 3.3 parts per hundred parts of water at 35° C. In a solution saturated with sodium metaborate, the new double salt is soluble only to the extent of 0.2 parts per hundred parts of water at 25° C. and 1.0 parts per hundred parts of water at 35° C. The foregoing values represent the approximate quantities of the fully hydrated new double salt which will dissolve completely in the stated quantity of water or the stated quantity of water saturated with the stated solubility depressing agent.

It is, therefore, the general object of the present invention to provide a new double salt which possesses value for use in various industries. It is a further object of the present invention to provide a method of producing such salt.

In addition to the fact that the new double salt itself is of value for various purposes, the processes of producing the new double salt have been found to be of considerable value as a means for purifying different solutions from either an undesirable phosphate content or an undesirable borate content.

Various further objects and advantages of the present invention will be more thoroughly understood from the description of different examples of processes of producing the double salt embodying the invention. For this purpose, there is hereafter described a number of examples or processes embodying the present invention and producing the new double salt of the present invention.

The simplest method of producing the new double salt is by admixing suitable solutions containing equal molecular portions of the component salts and crystallizing out the resultant formed double salt at a desired low temperature. Thus, a nearly saturated solution of trisodium phosphate may be added to a solution of sodium metaborate in sufficient quantity to produce equal molecular portions of the two salts, and there will be formed as a result the new double salt. This new double salt is but sparingly soluble at low temperatures such as 25° C. and, hence, can be precipitated therefrom if the solution is cooled or maintained at such temperature.

While in the foregoing example of the process for producing the new double salt, we have specified the use of molecular proportions of trisodium phosphate and sodium metaborate, it is not necessary to the success of the process that equal molecular proportions be used. In fact, where an excess of one or the other of such materials is utilized, the resulting solubility of the double salt is less and, in some cases, it is of advantage in producing the new double salt to use an excess of one of the ingredients. Particularly, where an excess of the sodium metaborate is utilized, the solubility of the resulting double salt produced by the process is greatly depressed.

It is also possible, in carrying out the process of the present invention, to increase the yield of the double salt by saturating or partially saturating the solution from which the double salt is produced with sodium chloride or other sodium containing compound.

Although this double salt is best prepared from its component parts, sodium metaborate, $NaBO_2$, and trisodium phosphate, $Na_3PO_4$, it may also be formed from solutions containing disodium phosphate and sodium metaborate or solutions containing sodium tetraborate (borax) and trisodium phosphate. In such cases due to equilibrium or partition conditions, there exists in solution sufficient quantities of trisodium phosphate in the first case, and sodium metaborate, in the second case, to form some of the double salt. However, the precipitation of the double salt will not be as complete as when all materials are in the proper form, and the remaining solution will contain appreciable quantities of both borates and phosphates. If more complete reaction and precipitation is desired, this may be accomplished by adjusting the alkalinity of the solution (pH) to correspond to that of the normal salts, for example, by the addition of caustic soda or other suitable alkaline materials.

The double salt is a compound the acid radicals of which are phosphoric anhydride, $P_2O_5$, and the boric anhydride, $B_2O_3$, and basic radical is sodium oxide, $Na_2O$. The ratio of the sodium oxide present to the basic radicals, $P_2O_5$ and $B_2O_3$, however, must be sufficient to correspond to that present in the normal salts of these anhydrides. The double salt may be precipitated from a solution which contains sufficient of any two of these radicals to form the double salt but lacks sufficient of the third radicals, by adding a material or solution containing a material which supplies the missing third radical.

The present invention has been found to be of particular value for the purpose of purifying certain salt solutions obtained from Searles Lake. Brine obtained from Searles Lake contains a very small quantity of phosphate compounds. Searles Lake brine is ordinarily evaporated for the concentration of potash and borax therein contained. During such evaporation sodium chloride, carbonate and sulphate are eliminated. As this process is ordinarily carried out, the remaining liquors, after crystallization of potash and borax therefrom, are recirculated in the process with the result that the system tends to accumulate its soluble impurities, such as the phosphate content.

The phosphate compounds and the borate compounds present in the solution are generally in too acidic form to precipitate completely the double salt of trisodium phosphate and sodium metaborate. It is essential to the complete formation of the new double salt that the hydrogen ion concentration (pH) of the solution be such that the soluble phosphates and borates entering into the reaction are in the normal or most basic form, i. e., the ratio of $Na_2O$ to $P_2O_3$ and $B_2O_3$ must be at a maximum. In the brines obtained from Searles Lake, as before mentioned, and in the various liquors obtained from the processes of treating these brines, the $B_2O_3$ content occurs both in the "meta" and "tetra" forms and the $P_2O_5$ content occurs both as trisodium and disodium phosphate. If the alkalinity of the brine or liquor in question is sufficiently increased to convert the borates and phosphates present to the basic forms of the sodium metaborate and trisodium phosphate, then these materials will act together, forming the double salt. This process of producing the double salt will have the result of purifying the liquid or brine from the phosphate compounds which, in this particular case, may be considered as an undesirable impurity. The precipitation of the double salt is particularly complete in view of the excess of borate compounds and other sodium salts present. The following example of a process of producing the new double salt will illustrate the value of such process as a means for purifying solutions from phosphate compounds.

A liquor or brine obtained from a process of refining borax derived from Searles Lake brine possessed the following percentage composition at 25° C.:

Total $B_2O_3$, calculated as $NaBO_2$ _____ 4.44
Total $CO_2$, calculated as $Na_2CO_3$ _____ 3.05
Total $P_2O_5$, calculated as $Na_3PO_4$ _____ 1.61
Total NaCl _____ 3.67
Total KCl _____ 4.55

To this mixture was added sufficient caustic to convert all of the sodium tetraborate to sodium metaborate, and the solution maintained or thereafter cooled to the temperature of 25° C. A crystal precipitate was then obtained consisting essentially of the double salt $Na_3PO_4 \cdot NaBO_2 \cdot 18H_2O$. The remaining liquor had the following percentage composition:

$NaBO_2$ _____ 4.17
$Na_2CO_3$ _____ 3.18
$Na_3PO_4$ _____ 0.40
NaCl _____ 3.75
KCl _____ 4.59

From the foregoing example of the invention it appears that by adding alkali sufficient to convert the borates and the phosphates to the basic or normal form, approximately 76% of the phosphate compounds were removed from the solution. In another example where the phosphates in the brine had accumulated to a greater degree, the process eliminated over 90% of the phosphates, producing a valuable crop of the new double salt.

The process is also of value for either recovering borates from impure solutions by precipitation, where the borate content is of value, or for purifying solutions of borates where the remaining solution is of value. For example, certain brines derived from Owens Lake through a certain process of precipitating some of the salt content, possess the following percentage analysis at 5° C.:

| | |
|---|---|
| $NaBO_2$ | 3.4 |
| $Na_2SO_4$ | 2.9 |
| $Na_2CO_3$ | 4.5 |
| $KCl$ | 4.1 |
| $NaCl$ | 17.0 |

To recover the borate content of such a solution is expensive and difficult by ordinary processes of concentration and crystallization. The borate content of this brine is in the basic form, rather than the acidic form (borax), which exists in Searles Lake brine. The processes which are applied to Searles Lake brine for the recovery of borax are not suitable generally for the removal of the borates from Owens Lake brine.

The borate content of this brine may be readily recovered by the addition of the proper amount of trisodium phosphate thereto. The addition of trisodium phosphate, or a solution thereof, to this brine results in the formation of a double salt which, in the presence of the other sodium salts and the low temperature at which the brine exists, is particularly insoluble, and a comparatively complete recovery of the borates, as well as the added phosphates, may be readily obtained.

The borate of the double salt thus recovered by this process or by any of the other examples herein given may, if desired, be converted into borax. This may be accomplished by re-dissolving the precipitated double salt and acidifying the same, such as by the addition of carbon dioxide, boric acid or sulphuric acid. The double salt when acidified sufficiently, forms borax and disodium phosphate. Thereafter the borax may be readily obtained as a precipitate by well known means of fractional crystallization. A cyclic process may thus be provided in which the end liquor, after the recovery of borax, may be added to further quantities of this Owens Lake brine, either with or without previously making the end liquor more alkaline, thereby utilizing the remaining phosphate for the further removal of sodium metaborate thru the medium of the double salt.

The process also may be used for precipitation of the phosphate content of impure phosphate solutions, such as occur in the process of manufacture of commercial phosphates. In such processes phosphate end liquors are obtained which become considerably impure and there exists no simple means of recovering the residual phosphate content prior to discarding such end liquors for elimination of the impurities. By adding the normal sodium borate compound or the sodium metaborate to such solutions in the proper quantities, and cooling to a suitable temperature, substantially all of the phosphate content may be recovered in the form of double salt. The presence of the impurities, usually, comprising several sodium salts, does not interfere with the process of this invention, but makes it the more effective, as hereinbefore explained.

The hydrated compound $$Na_3PO_4.NaBO_2.18H_2O.$$

may, as is usual upon heating, lose different quantities of its water of hydration or crystallization and thus be marketed with less water than corresponds to the above formula.

While the particular processes herein described, as well as the particular product, are well adapted to carry out the objects of this invention, it is to be understood that the invention includes all such modifications and changes as may come within the scope of the appended claims. Moreover, while the double salt as precipitated from solution is in the hydrated form, it has a tendency toward dehydration, and the invention includes the double salt whether in completely hydrated, partially hydrated, or dehydrated form.

We claim:

1. A new article of manufacture consisting of a double salt of trisodium phosphate and sodium metaborate with water of crystallization.

2. A new article of manufacture consisting essentially of the dehydration product of a double salt of trisodium phosphate and sodium metaborate.

3. A new article of manufacture having assentially the composition $$Na_3PO_4.NaBO_2.18H_2O.$$

Signed at Trona, California, this 25th day of June 1929.

WILLIAM A. GALE.
CHARLES F. RITCHIE.